(12) United States Patent
Matsuo

(10) Patent No.: US 10,668,813 B2
(45) Date of Patent: Jun. 2, 2020

(54) CONTROL DEVICE FOR TRANSPORT VEHICLE

(71) Applicant: HONDA MOTOR CO., LTD., Tokyo (JP)

(72) Inventor: Yuhei Matsuo, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 296 days.

(21) Appl. No.: 15/922,383

(22) Filed: Mar. 15, 2018

(65) Prior Publication Data

US 2018/0264948 A1  Sep. 20, 2018

(30) Foreign Application Priority Data

Mar. 17, 2017  (JP) ................................. 2017-052173

(51) Int. Cl.
*B60L 9/00* (2019.01)
*B60L 3/06* (2006.01)
*B60L 15/20* (2006.01)

(52) U.S. Cl.
CPC ............. *B60L 3/06* (2013.01); *B60L 15/2027* (2013.01); *B60L 15/2072* (2013.01); *B60L 15/2081* (2013.01); *B60L 2240/12* (2013.01); *B60L 2240/423* (2013.01); *B60L 2240/425* (2013.01); *B60L 2240/525* (2013.01); *Y02T 10/623* (2013.01); *Y02T 10/6221* (2013.01); *Y02T 10/6243* (2013.01); *Y02T 10/6265* (2013.01); *Y02T 10/7077* (2013.01); *Y02T 10/7241* (2013.01); *Y02T 10/7275* (2013.01)

(58) Field of Classification Search
CPC .... B60L 3/06; B60L 15/2081; B60L 15/2027; B60L 15/2072; B60L 2240/425; B60L 2240/525; B60L 2240/423; B60L 2240/12; Y02T 10/7077; Y02T 10/7275; Y02T 10/623; Y02T 10/6221; Y02T 10/6265; Y02T 10/6243; Y02T 10/7241; B60W 40/105; B60W 20/00; B60W 10/08
USPC .................................... 701/22, 110; 318/432
See application file for complete search history.

(56) References Cited

U.S. PATENT DOCUMENTS

| | | | |
|---|---|---|---|
| 10,023,180 B2 * | 7/2018 | Suenaga | B60W 10/115 |
| 2013/0054062 A1 * | 2/2013 | Matsushita | B60K 6/448 |
| | | | 701/22 |
| 2013/0282220 A1 * | 10/2013 | Tachikawa | B60L 3/0084 |
| | | | 701/22 |

(Continued)

FOREIGN PATENT DOCUMENTS

JP          2013-049368 A          3/2013

*Primary Examiner* — Shardul D Patel
(74) *Attorney, Agent, or Firm* — Paratus Law Group, PLLC

(57) ABSTRACT

A control device for a transport vehicle configured to travel with a driving force output from an electric motor is provided. When the transport vehicle is driven by a driving force of the electric motor and a variation rate is equal to or less than a predetermined value while a parameter relating to a traveling speed of the transport vehicle is less than a first predetermined value, the control device sets a threshold value, at which an output limit of the electric motor is started based on a parameter relating to a temperature of the electric motor or a temperature of an electric device for driving the electric motor, to a variable value corresponding to a required driving force to the transport.

12 Claims, 8 Drawing Sheets

(56) References Cited

U.S. PATENT DOCUMENTS

| | | | |
|---|---|---|---|
| 2014/0114553 A1* | 4/2014 | Abdul-Rasool | B60W 10/06 701/110 |
| 2016/0185254 A1* | 6/2016 | Ariyoshi | B60K 6/48 701/22 |
| 2018/0186362 A1* | 7/2018 | Koga | F16H 61/02 |

* cited by examiner

CONTROL DEVICE FOR TRANSPORT VEHICLE

CROSS-REFERENCE TO RELATED APPLICATION

The present application claims the benefit of priority of Japanese Patent Application No. 2017-052173, filed on Mar. 17, 2017, the content of which is incorporated herein by reference.

BACKGROUND

1. Field of the Invention

The present invention relates to a control device for a transport vehicle that can travels with a driving force output from an electric motor.

2. Description of the Related Art

In a control device for a vehicle disclosed in JP-A-2013-49368, since an accelerator pedal is depressed with a substantially constant operation amount on an uphill road, when it is determined that the vehicle is in a "stalled state" being stopped in a state in which an output torque is transmitted to driving wheels from an electric motor, a motor torque instruction value is generated so that the output torque of the electric motor decreases and a brake torque instruction value is generated so that a braking power of a brake unit is increased by a braking power equivalent to an decrement in the output torque of the electric motor when a temperature of a source power supply circuit rises to a temperature equal to or higher than a predetermined value.

In the vehicle disclosed in JP-A-2013-49368, the output torque of the electric motor is decreased when the temperature of the source power supply circuit rises to a temperature equal to or higher the predetermined value, but the temperature does not rapidly lowers even when the output torque of the electric motor is decreased.

For this reason, when the required driving force increases in a state where the temperature does not sufficiently lower from the predetermined value and the output torque of the electric motor increases according to the required driving force, the temperature of the source power supply circuit rises up to the threshold voltage for a relatively short time. As a result, there is a high possibility that the output limit is frequently performed immediately after the required driving force of the electric motor being in the stalled state increases.

SUMMARY

An object of the invention is to provide a control device for a transport vehicle capable of operating an electric motor without an output limit immediately after a required driving force for an electric motor being in a stalled state increases.

According to a first aspect of the invention, there is provided a control device for a transport vehicle configured to travel with a driving force output from an electric motor, wherein when the transport vehicle is driven by a driving force of the electric motor and a variation rate is equal to or less than a predetermined value while a parameter relating to a traveling speed of the transport vehicle is less than a first predetermined value, the control device sets a threshold value, at which an output limit of the electric motor is started based on a parameter relating to a temperature of the electric motor or a temperature of an electric device for driving the electric motor, to a variable value corresponding to a required driving force to the transport vehicle.

According to a second aspect of the invention, in the control device according to the first aspect, the threshold value to be set when the required driving force is less than a second predetermined value is lower than the threshold value to be set when the required driving force is equal to or larger than the second predetermined value.

According to a third aspect of the invention, in the control device according to the first aspect or the second aspect, the electric motor is a polyphase electric motor, and the first predetermined value is an upper limit value at which a load is capable of concentrating on one phase in the electric motor or the electric device.

According to a fourth aspect of the invention, in the control device according to the second aspect or the third aspect, when the required driving force is equal to or larger than a third predetermined value smaller than the second predetermined value and is less than the second predetermined value, the output limit is performed by limiting a torque of the electric motor.

According to a fifth aspect of the invention, in the control device according to any one of the second to fourth aspects, the threshold value to be set when the required driving force is equal to or larger than the second predetermined value is equal to a maximum value of the threshold value capable of being set in the transport vehicle.

According to a sixth aspect of the invention, in the control device according to the fourth aspect, the transport vehicle includes a driving source configured to drive the transport vehicle, the electric motor drives one driving axle of the transport vehicle, the driving source drives the other driving axle of the transport vehicle, and the driving force of the driving source is increased while the torque of the electric motor is limited.

According to the first aspect, when the electric motor is driven and the electric motor is in the stalled state because there is no change in the state where the traveling speed of the transport vehicle is low, the output limit of the electric motor is started, and the threshold value is set to the variable value corresponding to the required driving force of the transport vehicle. For this reason, when the threshold value according to the low required driving force when the electric motor is in the stalled state is set lower than the normal threshold value, since the parameter relating to the electric motor being in the stalled state or the electric device is suppressed to a value sufficiently lower than the normal threshold value due to the output limit corresponding to the low threshold value. When the required driving force for the electric motor increases in this state, since the output limit of the electric motor is performed based on the normal threshold value, the parameter relating to the electric motor or the electric device has a margin up to the normal threshold value. For this reason, the electric motor can operate without the output limit immediately after the required driving force increases.

When the electric motor is in the stalled state and the required driving force is less than the second predetermined value, there is a high possibility that the transport vehicle is stopped with a balance of the driving force on the uphill road. Therefore, according to the second aspect, the value to be set when the required driving force is less than the second predetermined value is set lower than the value to be set when the required driving value is equal to or larger than the second predetermined value, and thus it is possible to suppress overheating due to the output limit corresponding to the low threshold value when the required driving force is less than the second predetermined value and to perform the output limit the electric motor according to a high threshold value when the required driving force increases from this state to the second predetermined value or more. Therefore, the electric motor can operate without the output limit immediately after the required driving force increases.

In the transport vehicle, no overloading occurs unless one phase concentration does not occur in the electric motor, which is a polyphase electric motor, or the electric device for driving the electric motor. According to the third aspect, the threshold value is set to the variable value only when the condition that the parameter relating to the traveling speed of the transport vehicle is less than the upper limit value at which one phase concentration can occur in the electric motor or the electric device for driving the electric motor is satisfied, the unnecessary setting change of the threshold value can be prevented.

The parameter relating to the electric motor or the electric device is proportional to the square of the current flowing therethrough, and the current is proportional to the torque of the electric motor. Therefore, according to the fourth aspect, the torque of the electric motor is limited when the required driving force is equal to or larger than the third predetermined value and less than the second predetermined value, and thus the temperature rise of the electric motor or the electric device can be delayed.

Since the intention of the driver to accelerate is strong when the required driving force is equal to or larger than the second predetermined value, as in the invention according to the fifth aspect, the threshold value is set to the maximum value, whereby the frequent output limit of the electric motor can be prevented.

According to the sixth aspect, since the driving force of the driving source increases while the torque of the electric motor is limited, the total of the driving forces transmitted to both driving axles can satisfy the required driving force and the temperature of the electric motor or the electric device can be suppressed within the threshold value.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 9 is a diagram illustrating an internal configuration of a transmission according to another embodiment and a relation between the transmission and an internal combustion engine, an electric motor, and the like.

DETAILED DESCRIPTION OF THE INVENTION

A hybrid electric vehicle (HEV) mounted with a control device according to an embodiment of the invention will be described below with reference to the drawings.

Figure 1:
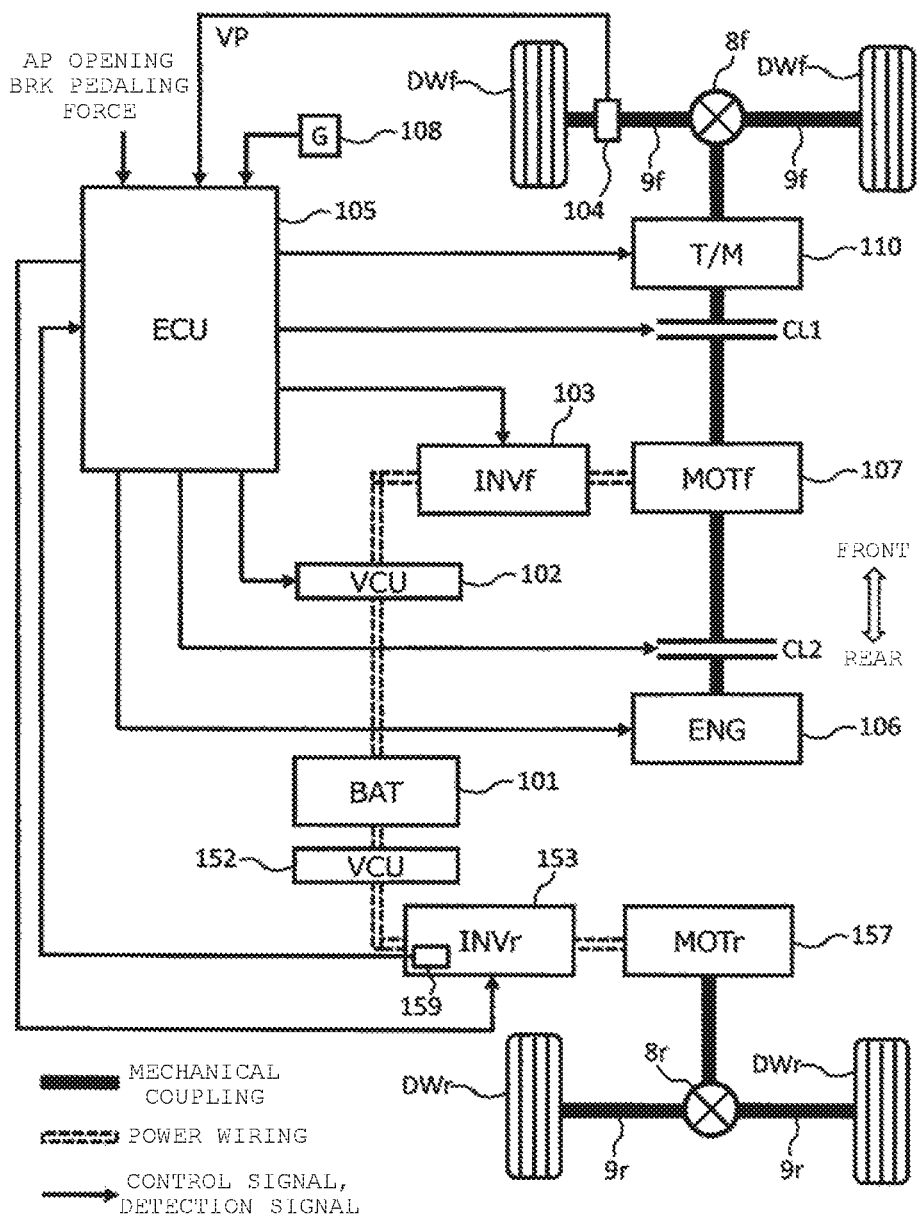
FIG. 1 is a block diagram illustrating an internal configuration of a hybrid electric vehicle according to one embodiment.

FIG. 1 is a block diagram illustrating an internal configuration of the hybrid electric vehicle according to the embodiment. The hybrid electric vehicle (hereinafter, simply referred to as a "vehicle") illustrated in FIG. 1 includes an internal combustion engine (ENG) 106, an electric motor (MOTf) 107, a transmission (T/M) 110, a connecting/disconnecting unit CL1, a connecting/disconnecting unit CL2, a battery (BAT), 101, a VCU (Voltage Control Unit) 102, an inverter (INVf) 103, a speed sensor 104, an acceleration sensor 108, an electric motor (MOTr) 157, a VCU (Voltage Control Unit) 152, an inverter (INVr) 153, a temperature sensor 159, and an ECU (Electronic Control Unit) 105. The vehicle travels with power of the internal combustion engine 106 and/or the electric motors 107 and 157 according to traveling conditions, for example. In FIG. 1, a thick solid line indicates mechanical coupling, a double dotted line indicates power wiring, and a thin solid line arrow indicates a control signal or a detection signal.

The internal combustion engine 106 outputs a driving force that travels a vehicle. The driving force output from the internal combustion engine 106 is transmitted to front driving wheels DWf via the connecting/disconnecting unit CL1, the connecting/disconnecting unit CL2, the transmission 110, a differential gear 8f, and a driving axle 9f. The electric motor 107 is a three-phase brushless DC motor, and outputs a driving force for traveling the vehicle and/or power for starting the internal combustion engine 106. The driving force for the vehicle traveling output from the electric motor 107 is transmitted to the front driving wheels DWf via the connecting/disconnecting unit CL1, the transmission 110, the differential gear 8f, and the driving axle 9f. In addition, the electric motor 107 can operate as a generator at the time of braking of the vehicle (regenerative operation).

The transmission 110 shifts the driving force output from at least one of the internal combustion engine 106 and the electric motor 107 at a predetermined gear ratio and transmits the shifted driving force to the driving wheels DWf. The gear ratio of the transmission 110 is changed according to an instruction from the ECU 105. The transmission 110 may be a transmission in which a plurality of different gear ratios are set stepwise or a continuously variable transmission capable of continuously changing the gear ratio.

The connecting/disconnecting unit CL1 connects and disconnects a power transmission path between the transmission 110 and the electric motor 107 according to an instruction from the ECU 105. The connecting/disconnecting unit CL2 connects and disconnects a power transmission path between the electric motor 107 and the internal combustion engine 106 according to an instruction from the ECU 105.

The battery 101 includes a plurality of battery cells which are connected to each other in series or in parallel, and supplies a high voltage of 100 to 200 V, for example. The battery cells are, for example, a lithium ion battery or a nickel hydrogen battery. The VCU 102 raises a direct-current output voltage of the battery 101. In addition, the VCU 102 steps down the electric power that is generated by the electric motor 107 and converted into a direct current during the regenerative operation of the electric motor 107. The electric power stepped down by the VCU 102 is charged in the battery 101. The inverter 103 converts the DC voltage into an AC voltage and supplies a three-phase current to the electric motor 107. In addition, the inverter 103 converts the AC voltage generated by the electric motor 107 during the regenerative operation of the electric motor 107 into a DC voltage.

The speed sensor 104 detects a traveling speed of the vehicle (vehicle speed VP). A signal indicating the vehicle speed VP detected by the speed sensor 104 is sent to the ECU 105.

The acceleration sensor 108 detects acceleration acting in a front-rear direction of the vehicle (hereinafter, referred to as "front-rear acceleration"). A signal indicating the front-rear acceleration by the acceleration sensor 111 is set to the ECU 105. A value of the front-rear acceleration indicates a positive value when acceleration is applied in the front direction of the vehicle and a negative value when acceleration is applied in the rear direction of the vehicle. Therefore, the value of the front-rear acceleration indicates the positive value in a state where the vehicle is stopped on an uphill road, and the value of the front-rear acceleration indicates the negative value in a state where the vehicle is stopped on a downhill road. It is estimated that as an absolute value of the front-rear acceleration in a state where the vehicle is stopped on the inclined road becomes larger, the inclination of the road becomes greater.

The electric motor 157 is a three-phase brushless DC motor, and outputs a driving force for traveling the vehicle. The driving force for the vehicle traveling output from the electric motor 157 is transmitted to rear driving wheels DWr via a differential gear 8r and a driving axle 9r. In addition, the electric motor 157 can operate as a generator at the time of braking of the vehicle (regenerative operation).

The VCU 152 raises a direct-current output voltage of the battery 101. In addition, the VCU 152 steps down the electric power that is generated by the electric motor 157 and converted into a direct current during the regenerative operation of the electric motor 157. The electric power stepped down by the VCU 152 is charged in the battery 101. The inverter 153 converts the DC voltage into an AC voltage and supplies a three-phase current to the electric motor 157. In addition, the inverter 153 converts the AC voltage generated by the electric motor 157 during the regenerative operation of the electric motor 157 into a DC voltage.

Figure 2:
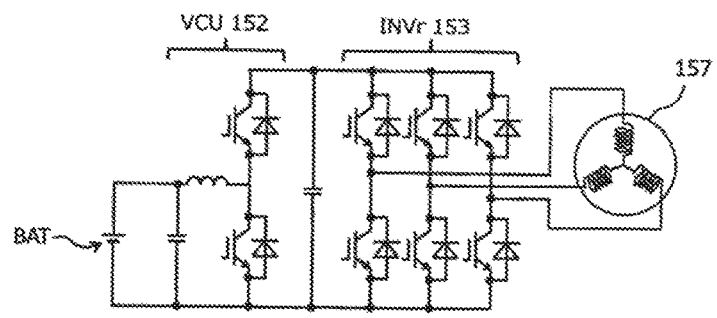
FIG. 2 is an electric circuit diagram illustrating a relation between a battery, a VCU, an inverter, and an electric motor.

FIG. 2 is an electric circuit diagram illustrating a relation between the battery 101, the VCU 152, the inverter 153, and the electric motor 157. As illustrated in FIG. 2, the VCU 152 switches on/off two switching elements using a voltage V1 output from the battery 101 as an input voltage, and thus raises an output-side voltage V2 to a voltage higher than the voltage V1. In addition, the inverter 153 switches on/off sequentially two switching elements corresponding to each phase, and converts the voltage V2 output from the VCU 152 into a three-phase AC voltage.

Three-phase AV voltage is applied to the electric motor 157. However, in a case where the electric motor 157 needs to output a torque in a state in which the rotor (not illustrated) of the electric motor 157 hardly rotates, an AC voltage is applied to only one phase of three phases. At this time, the inverter 153 is in a so-called one phase concentration state in which only two switching elements corresponding to the phase to which the AC voltage is applied to the electric motor 157 are switched on and off.

The temperature sensor 159 detects a temperature (hereinafter, referred to as a "chip temperature") T of the switching element in the electric motor 107 or the inverter 103. A signal indicating the chip temperature T detected by the temperature sensor 159 is sent to the ECU 105.

The ECU 105 performs an output control of the electric motor 107 under the control of the VCU 102 and the inverter 103, a control of the transmission 110, a connecting/disconnecting control of the connecting/disconnecting unit CL1 and the connecting/disconnecting unit CL2, a driving control of the internal combustion engine 106, and an output control of the electric motor 157 under the control of the VCU 152 and the inverter 153. In addition, the ECU 105 receives, for example, a signal indicating an accelerator pedal opening (AP opening) in response to an accelerator pedal operation of a vehicle driver, a signal indicating the vehicle speed VP from the speed sensor 104, and a signal indicating the chip temperature T from the temperature sensor 159. The ECU 105 derives a driving force (hereinafter, referred to as a "required driving force") required for the vehicle based on the AP opening and the vehicle speed VP. The ECU 105 selects a vehicle traveling mode (to be described below) based on the vehicle speed VP and the required driving force, for example, and controls the states of the transmission 110, the connecting/disconnecting unit CL1, and the connecting/disconnecting unit CL2 and the driving forces output from the internal combustion engine 106 and the electric motors 107 and 157. The ECU 105 performs a control to limit the output of the electric motor 157 based on the chip temperature T.

The vehicle according to the embodiment travels in any one of "EV traveling mode", "parallel traveling mode", and "engine traveling mode" in which a driving source including the internal combustion engine 106 and the electric motors 107 and 157 is different in the form of use.

During the acceleration traveling in the EV traveling mode, the vehicle travels with the driving force from the electric motor 107 and/or the electric motor 157. When the vehicle travels in the EV traveling mode, the ECU 105 allows the connecting/disconnecting unit CL1 to be locked, and opens the connecting/disconnecting unit CL2. During the acceleration traveling in the parallel traveling mode, the vehicle travels with combined power of the driving force from the internal combustion engine 106 and the driving force from the electric motor 107 and/or the electric motor 157. When the vehicle travels in the parallel traveling mode, the ECU 105 allows the connecting/disconnecting unit CL1 and the connecting/disconnecting unit CL2 to be locked together. During the acceleration traveling in the engine traveling mode, the vehicle travels with the driving force from the internal combustion engine 106. When the vehicle travels in the engine traveling mode, the ECU 105 allows the connecting/disconnecting unit CL1 and the connecting/disconnecting unit CL2 to be locked together.

In the vehicle having the configuration illustrated in FIG. 1, since the accelerator pedal is depressed with a substantially constant operation amount on the uphill road, the driving force output from at least one of the internal combustion engine 106 and the electric motor 107 is transmitted to the front driving axle 9f and the driving force output from the electric motor 157 is transmitted to the rear driving axle 9r, but the control of the ECU 105 in the "stalled state" in which the vehicle is stopped will be described in detail with reference to FIGS. 3 to 7.

Figure 3:
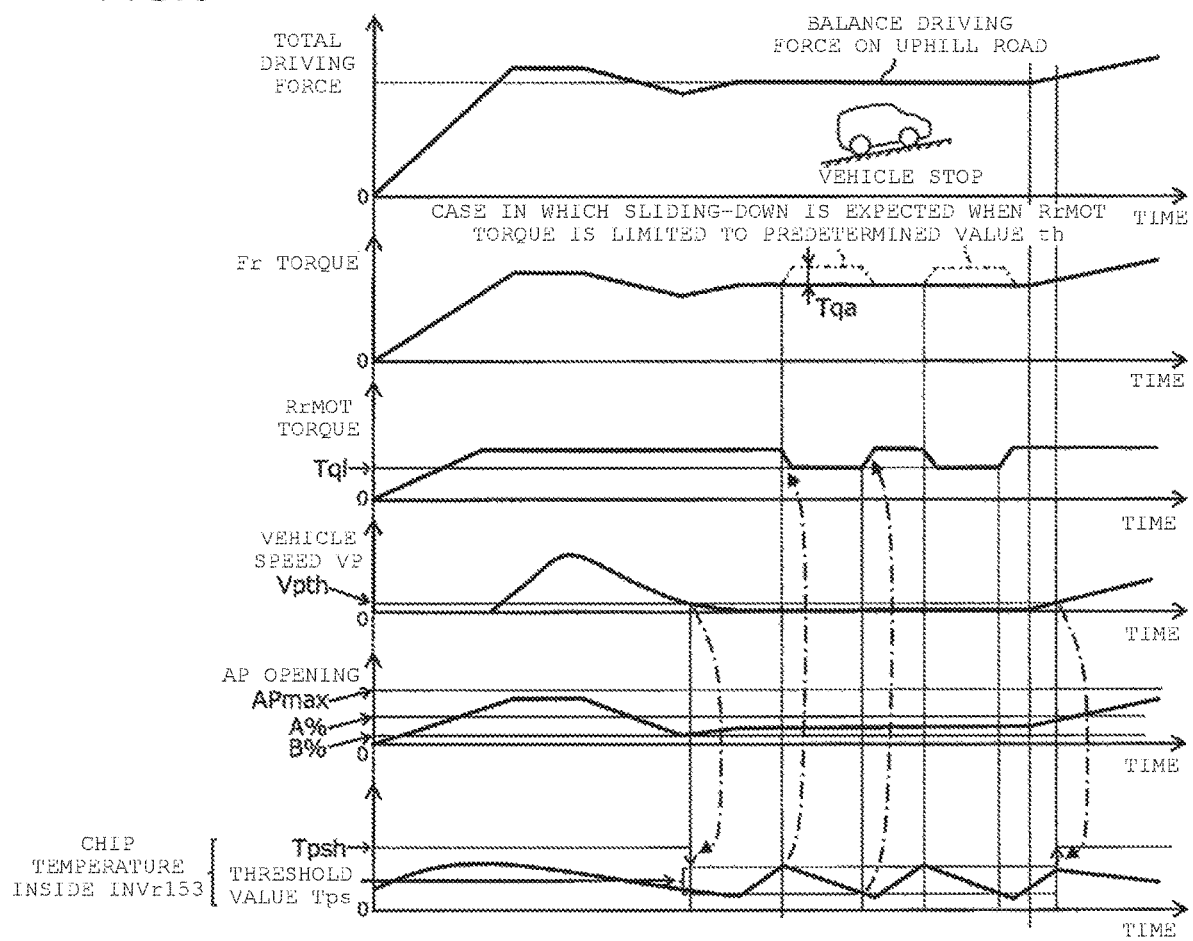
FIG. 3 is a graph illustrating an example of a change with time of parameters when restarts traveling after a vehicle traveling on an uphill road stops traveling and enters a stalled state.

FIG. 3 is a graph illustrating an example of a change with time of parameters when restarts traveling after the vehicle traveling on the uphill road stops traveling and enters the stalled state. In the example illustrated in FIG. 3, after the total of the driving forces (total driving force) transmitted to the front driving axle 9f and the rear driving axle 9r increases as the AP opening increases, the AP opening is not 0 but becomes smaller, so that the vehicle traveling on the uphill road stops in the middle of the uphill road. At this time, the AP opening is not 0 but is maintained at a substantially constant value, and a variation rate $\Delta VP$ is a predetermined value "th" or less while the vehicle speed VP is still less than a predetermined value VPth. The predetermined value VPth is an upper limit value at which a load can be concentrated on one phase in the inverter 153 for driving the electric motor 157 or the electric motor 157 which is rotated at a speed proportional to the vehicle speed VP. Therefore, the vehicle is stalled in the electric motor 157 in a state where at least the driving force of the electric motor 157 is transmitted to the driving axle 9r and the variation rate $\Delta VP$ is the predetermined value "th" or less while the vehicle speed VP is still less than the predetermined value VPth.

When the vehicle speed VP is less than the predetermined value VPth and the variation rate $\Delta VP$ is the predetermined value "th" or less, the ECU 105 limits the output of the electric motor 157 based on the chip temperature T when the AP opening is not equal to or larger than the threshold value APmax and sets the threshold value Tps to a variable value corresponding to the AP opening. The threshold value APmax is, for example, a maximum value (100%) of the AP opening in the vehicle. When the AP opening is equal to the threshold value APmax and the vehicle speed VP is low, for example, it is considered that the vehicle is under a circumstance that it rides over obstacles such as curbstones. Under this circumstance, it is not preferable to change the output limit threshold value Tps of the electric motor 157. For this reason, even when the vehicle speed VP is less than the predetermined value VPth and the variation rate $\Delta VP$ is the predetermined value "th" or less, the ECU 105 does not change the set of the threshold value Tps when the AP opening is equal to or larger than the threshold value APmax. In this case, the ECU 105 may inform the driver, using voice or meter display, that the driving force reaches the limit.

Figure 4:
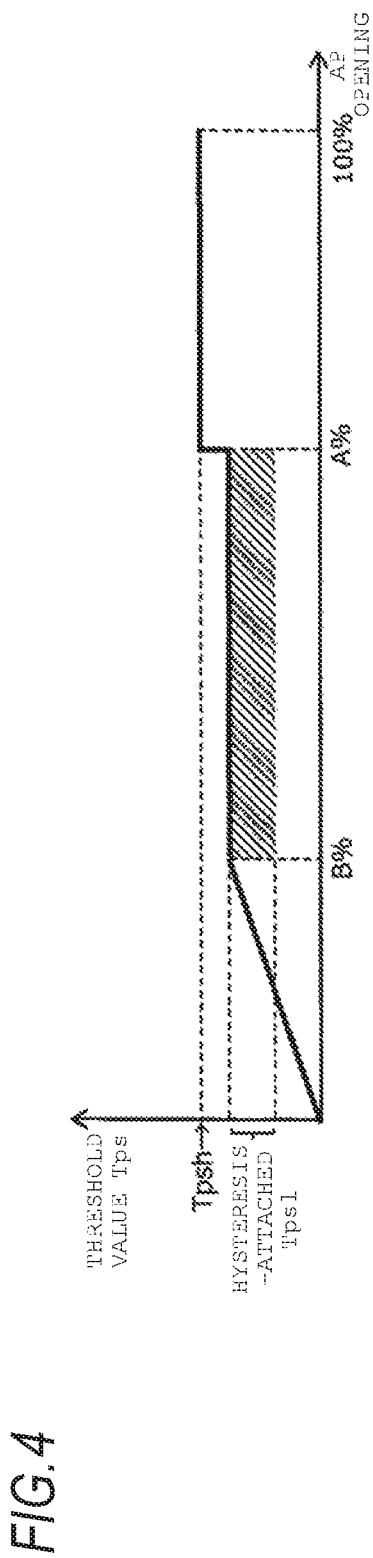
FIG. 4 is a graph illustrating a relation between an AP opening and an output limit threshold value of an electric motor set by an ECU when the electric motor is in the stalled state.

FIG. 4 is a graph illustrating a relation between the AP opening and the output limit threshold value Tps of the electric motor 157 set by the ECU 105 when the electric motor 157 is in the stalled state. As illustrated in FIG. 4, when setting the threshold value Tps to the variable value corresponding to the AP opening, the ECU 105 sets a normal threshold value Tpsh to be set when the electric motor 157 is not in the stalled state if the AP opening is equal to or larger than a predetermined value A %, and sets a threshold value Tpsl smaller than the threshold value Tpsh when the AP opening is less than the predetermined value A % and is equal to or larger than a predetermined value B % smaller than the predetermined value A %. Hysteresis is set in the threshold value Tpsl. In addition, the predetermined value A % to be compared with the AP opening is a minimum value of the AP opening when the driver of the vehicle intentionally accelerates. That is, when the AP opening is equal to or larger than A %, it is estimated that the driver depresses the accelerator pedal for the purpose of intentional acceleration.

Further, the ECU 105 sets a threshold value which is lower than an upper limit value of the threshold value Tpsl and is proportional to the AP opening when the AP opening is less than the predetermined value B %. When the AP opening is less than the predetermined value B %, a heating value in the electric motor 157 or the inverter 153 is naturally small, and the possibility of overheating of the chip temperature T is small, so the value proportional to the AP opening and lower than the threshold value Tpsl is set.

In this way, since the vehicle speed VP is less than the predetermined value VPth, the variation rate $\Delta VP$ is the predetermined value "th" or less, and the AP opening is equal to or larger than the predetermined value B % and less than the predetermined value A % at this time, when the output limit threshold value Tps of the electric motor 157 is set to the threshold value Tpsl and the chip temperature T reaches the upper limit value of the threshold value Tpsl as illustrated in FIG. 3, the ECU 105 performs an output limit control (hereinafter, referred to as "driving force limit control") by lowering a torque required for the electric motor 157 (hereinafter, referred to as "RrMOT torque") to the predetermined value Tql. Even when the RrMOT torque is lowered to the predetermined value Tql, the state of one phase concentration in the electric motor 157 and the inverter 153 does not change, but since a value of a current flowing through the electric motor 157 and the inverter 153 decreases, overheating due to one phase concentration can be prevented. As a result, overheating of the chip temperature T is suppressed not to exceed the threshold value Tpsl. Thereafter, when the chip temperature T drops to a lower limit value of the threshold value Tpsl, the ECU 105 cancels the driving force limit control.

Figure 5:
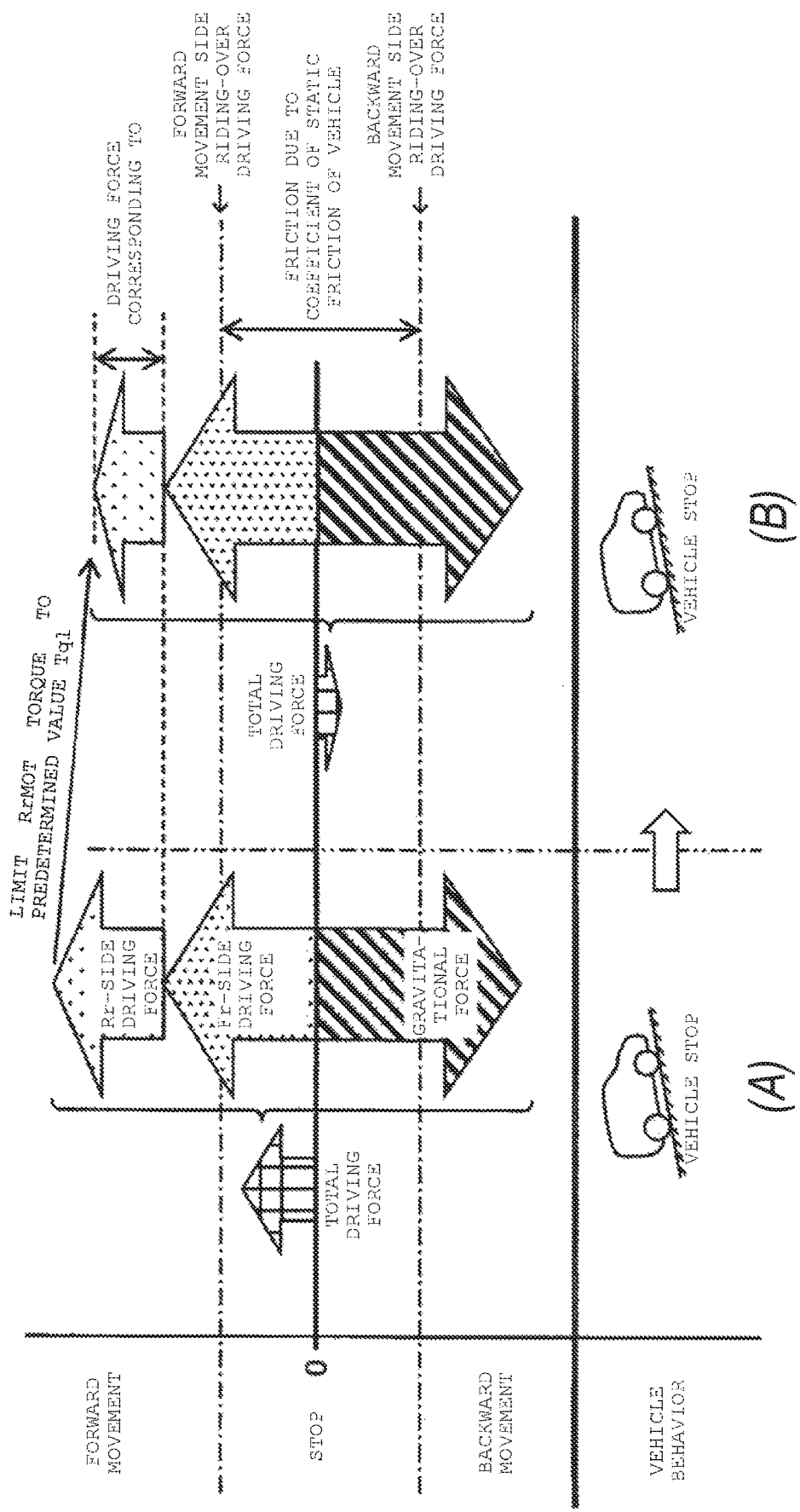
FIG. 5 is a conceptual diagram illustrating an example of a change in driving force before and after a driving force limit control is performed on a vehicle in which an electric motor is stalled.
Figure 6:
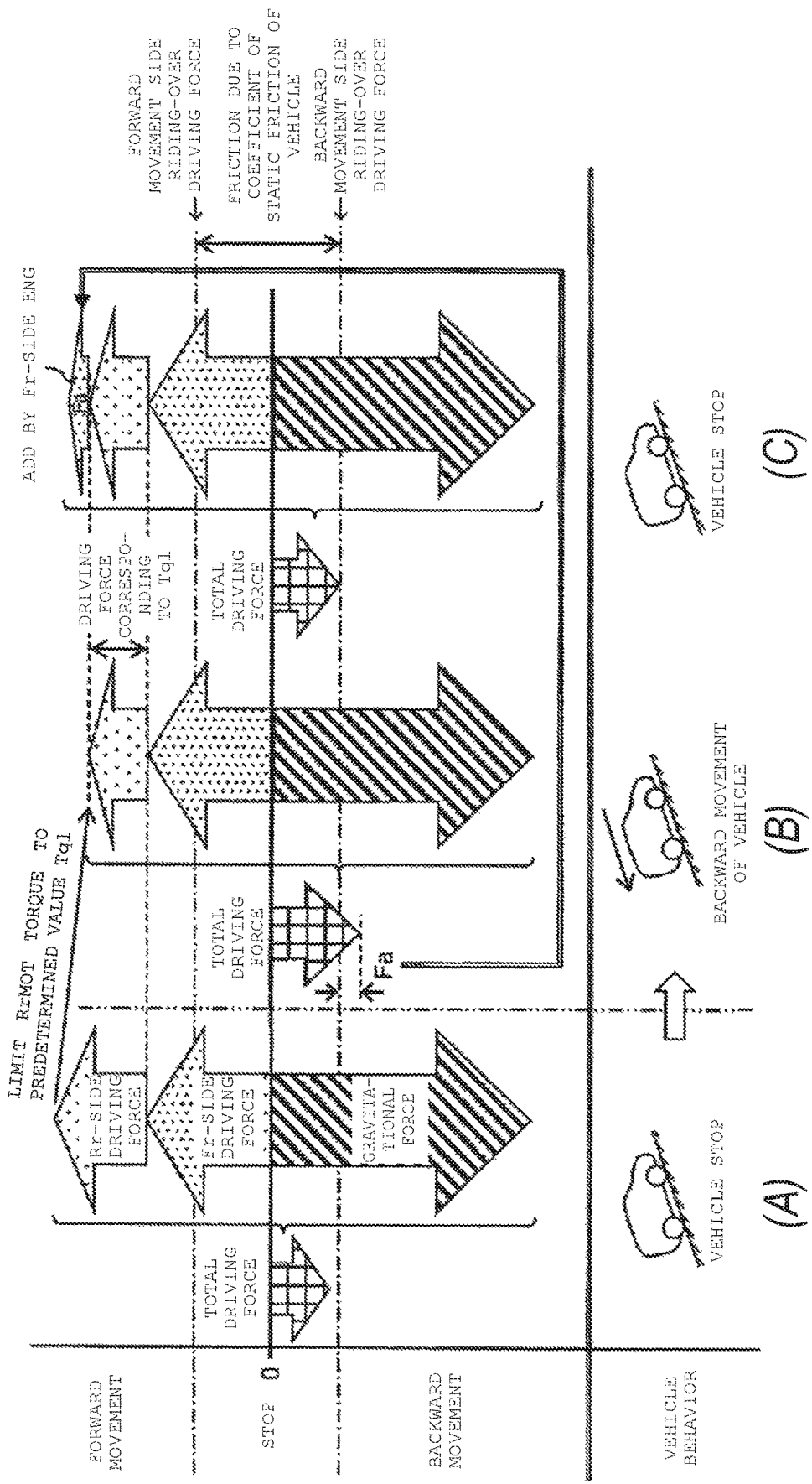
FIG. 6 is a conceptual diagram illustrating another example of a change in driving force before and after a driving force limit control is performed on a vehicle in which an electric motor is stalled.

FIGS. 5 and 6 are conceptual diagrams illustrating an example and another example of a change in driving force before and after the driving force limit control is performed on the stalled vehicle. In the vehicle stopped in the stalled state, as illustrated in a section (A) of FIG. 5 and a section (A) of FIG. 6, an absolute value of a total driving force is smaller than a riding-over driving force based on the friction due to the coefficient of static friction of the vehicle, the total driving force being a value obtained by the sum of a gravitational force applied to the vehicle on the uphill road, a driving force (Fr-side driving force) transmitted to the front driving axle 9f from at least one of the internal combustion engine 106 and the electric motor 107, and a driving force (Rr-side driving force) transmitted to the rear driving axle 9r from the electric motor 157. For this reason, the vehicle can maintain the stopped state. In this state, when the driving force limit control is performed on the electric motor 157, since the RrMOT torque is limited to the predetermined value Tql, the Rr-side driving force decreases.

When the absolute value of the total driving force during the driving force limit control is smaller than the riding-over driving force as illustrated in a section (B) of FIG. 5, the stopped state of the vehicle does not change. However, as illustrated in a section (B) of FIG. 6, when the absolute value of the total driving force exceeds the riding-over driving force, the vehicle moves backward. Therefore, in the embodiment, as illustrated in a section (C) of FIG. 6, the ECU 105 performs a driving force enlargement control such that the internal combustion engine 106 further outputs a driving force Fa equal to a difference between the absolute value of the total driving force due to the driving force limit control and the riding-over driving force. As a result, the absolute value of the total driving force during the driving force limit control and the driving force enlargement control becomes smaller than the riding-over driving force, and the vehicle can maintain the stopped state.

In the state where the When driving force limit control of the electric motor 157 is started described above and the threshold value Tps is set to the variable value corresponding to the AP opening, when the driver depresses the accelerator pedal to move the vehicle, it is determined whether the vehicle speed VP is equal to or larger than the predetermined value VPth. When the variation rate ΔVP exceeds the predetermined value "th", the ECU 105 returns the threshold value Tps to the normal threshold value Tpsh. At this time, when the change is performed from the threshold value Tpsl to the threshold value Tpsh, since the chip temperature T is equal to or lower than the threshold value Tpsl, there is a margin up to the normal threshold value Tpsh. For this reason, after the accelerator pedal is depressed and the required driving force increases, the electric motor 157 can operate without an output limit for the meanwhile.

Figure 7:
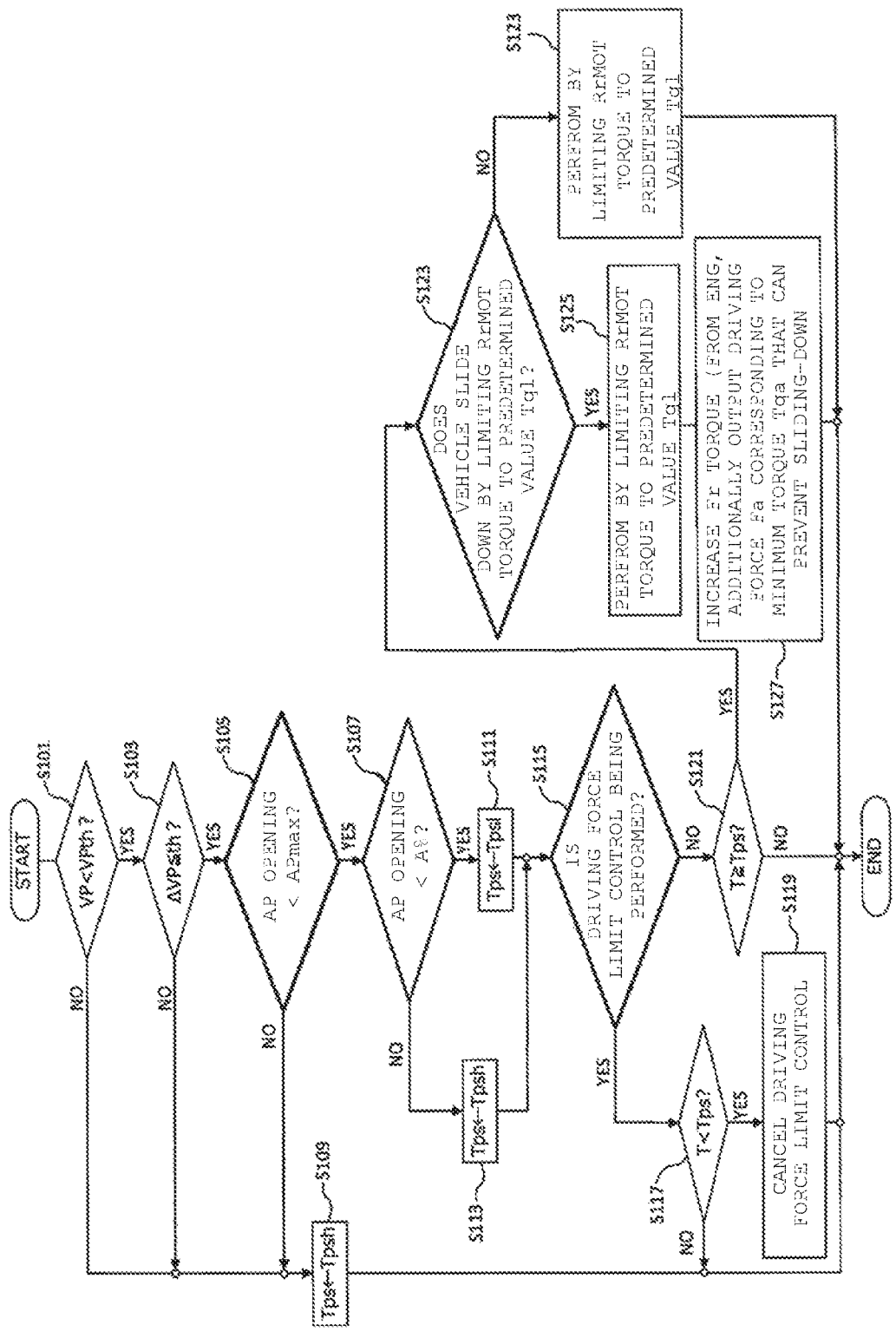
FIG. 7 is a flowchart illustrating a flow of processing performed by an ECU in a vehicle in which an electric motor is stalled.

FIG. 7 is a flowchart illustrating a flow of processing performed by the ECU 105 in the stalled vehicle. As illustrated in FIG. 7, the ECU 105 determines whether the vehicle speed VP is less than the predetermined value VPth (VP<VPth). If VP<VPth, the process proceeds to step S103, and if VP ≥ VPth, the process proceeds to step S109. In step S103, the ECU 105 determines whether the variation rate ΔVP of the vehicle speed VP is the predetermined value "th" or less (ΔVP<th). If ΔVP<th, the process proceeds to step S105, and if ΔVP>th, the process proceeds to step S109. In step S105, the ECU 105 determines whether the AP opening is less than the threshold value APmax (AP opening<APmax). If AP opening<APmax, the process proceeds to step S107, and if AP opening≥APmax, the process proceeds to step S109.

In step S107, the ECU 105 determines whether the AP opening is less than the predetermined value A % (AP opening<A %). If AP opening≤A %, the process proceeds to step S111, and if AP opening>A %, the process proceeds to step S113. In step S111, the ECU 105 sets the threshold value Tps for starting the driving force limit control of the electric motor 157 to the value Tpsl lower than the normal threshold value Tpsh. On the other hand, in step S113, the ECU 105 sets the threshold value Tps for starting the driving force limit control of the electric motor 157 to the threshold value Tpsh. In step S109, the ECU 105 also sets the threshold value Tps to the threshold value Tpsh.

After executing step S111 or step S113, the ECU 105 determines whether the driving force limit control is being performed on the electric motor 157 (step S115). If the driving force limit control is being performed, the process proceeds to step S117, and if the driving force limit control is not performed, the process proceeds to step S121. In step S117, the ECU 105 determines whether the chip temperature T is lower than the threshold value Tps (T<Tps). If T<Tps, the process proceeds to step S119, and if T≥Tps, a series of processes are terminated. On the other hand, in step S121, the ECU 105 determines whether the chip temperature T is equal to or higher than the threshold value Tps (T≥Tps). If T≥Tps, the process proceeds to step S123, and if T<Tps, a series of processes are terminated.

In step S123, as a result of limiting the RrMOT torque to the predetermined value Tql by performing the driving force limit control on the electric motor 157, the ECU 105 determines whether the vehicle stopped on the uphill road slides down from the signal indicating the front-rear acceleration obtained from the acceleration sensor 108. If the vehicle does not slide down, the process proceeds to step S123, and if the vehicle slides down, the process proceeds to step S125. Whether the vehicle stopped on the uphill road slides down may be determined by calculation based on the front-rear acceleration obtained from the acceleration sensor 108 as described above, or may be determined based on whether the sliding-down actually occurs when the driving force limit control is performed on the electric motor 157.

In step S123, the ECU 105 performs the driving force limit control by limiting the RrMOT torque to the predetermined value Tql. In step S125, the ECU 105 also performs the driving force limit control by limiting the RrMOT torque to the predetermined value Tql, and then the process proceeds to step S127. In step S127, the ECU 105 performs driving force enlargement control so that the internal combustion engine 106 further outputs the driving force Fa corresponding to a minimum torque Tqa (see FIG. 3) that can prevent the sliding-down. At this time, even when the internal combustion engine 106 further outputs the driving force larger than the driving force Fa, the backward movement of the vehicle is suppressed, but the fuel consumption amount of the internal combustion engine 106 increases. Therefore, as in the embodiment, it is possible to suppress the backward movement of the vehicle and to prevent the deterioration of the fuel consumption amount by increasing only the driving force Fa corresponding to the minimum torque Tqa that can prevent the sliding-down. However, in the case where the fuel consumption amount can be suppressed by increasing the driving force of the internal combustion engine 106 beyond the driving force Fa, exceptionally, the ECU 105 adjusts the driving force within a range in which the backward movement of the vehicle can be suppressed.

As described above, according to the embodiment, when the electric motor 157 is driven and the electric motor 157 is in the stalled state because there is no change in the state where the vehicle speed VP is low, the output limit of the electric motor 157 is started, and the threshold value Tps is set to the variable value corresponding to the AP opening. In addition, when the electric motor 157 is in the stalled state and the AP opening is less than A %, there is a high possibility that the vehicle is stopped with a balance of the driving force on the uphill road. In the embodiment, when the AP opening is less than A %, since the threshold value Tpsl lower than the normal threshold value Tpsh is set to the threshold value Tps, the chip temperature T when the electric motor 157 is in the stalled state is suppressed to a value sufficiently lower than the normal threshold value Tpsh due to the output limit corresponding to the low threshold value Tpsl. When the AP opening increases in this state, the output limit of the electric motor 157 is performed based on the normal threshold value Tpsh, but the chip temperature T at this time has a margin up to the normal threshold value Tpsh. For this reason, the electric motor 157 can operate without the output limit immediately after the AP opening increases.

In addition, when one phase concentration does not occur in the electric motor 157 or the inverter 153 which is a polyphase electric motor, no overload occurs. In the embodiment, since the threshold value Tps is set to the variable value only when the vehicle speed VP is less than the predetermined value VPth and the variation rate ΔVP is the predetermined value "th" or less which are conditions under which one phase concentration occurs in the electric motor 157 or the inverter 153, unnecessary setting change of the threshold value Tps can be prevented.

Further, the chip temperature T is proportional to the square of the current flowing through the inverter 153, and the current is proportional to the torque of the electric motor 157. Therefore, as in the embodiment, if the torque of the electric motor 157 is limited when the output limit of the electric motor 157 is performed, that is, when the driving force limit control is performed, the increase in the chip temperature T can be delayed.

Since the intention of the driver to accelerate is strong when the AP opening is equal to or larger than A %, the threshold value Tpsh can be set for the vehicle of the embodiment, and the threshold value is set to the maximum value, whereby the frequent output limit of the electric motor 157 can be prevented.

In the case where the vehicle moves backward by the driving force limit control, since the driving force enlargement control is performed by the internal combustion engine 106, the total of the driving forces transmitted to both driving axles 9f and 9r can satisfy the required driving force and the chip temperature T can be suppressed within the threshold value Tps.

It is to be noted that the invention is not limited to the embodiment described above, but may be appropriately modified, improved, and the like. For example, the embodiment exemplifies the case where the vehicle traveling on the uphill road stops traveling and enters the stalled state, but the invention can also be applied to a case where a vehicle traveling backwards on a downhill road stops traveling and enters a stalled state. Further, the ECU 105 may start the driving force limit control of the electric motor 157 and set the threshold value Tps to the variable value corresponding to the required driving force without being limited to the AP opening. In addition, the invention may be a configuration in which the electric motor 107, the inverter 103, and the VCU 102 are excluded from the configuration illustrated in FIG. 1. Further, the invention may be a configuration in which the internal combustion engine 106 is excluded from the configuration illustrated in FIG. 1, but, in this case, the driving force enlargement control cannot be performed. Therefore, in the case of YES in step S123 of FIG. 7, the process does not proceed to step S125 and a series of processes are terminated. In addition, the driving force limit control is performed on the electric motor 157, but may be performed on the electric motor 107 when the electric motor 157 is not provided.

Figure 8:
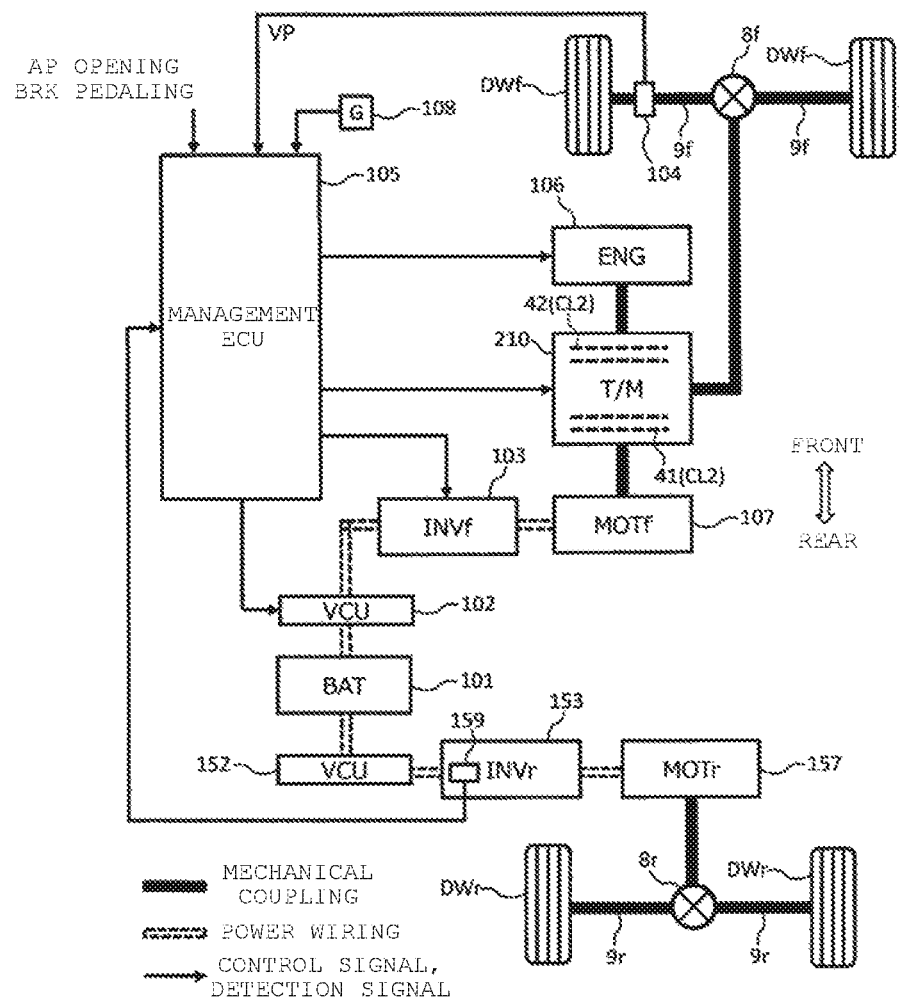
FIG. 8 is a block diagram illustrating an internal configuration of a hybrid electric vehicle according to another embodiment.
Figure 9:
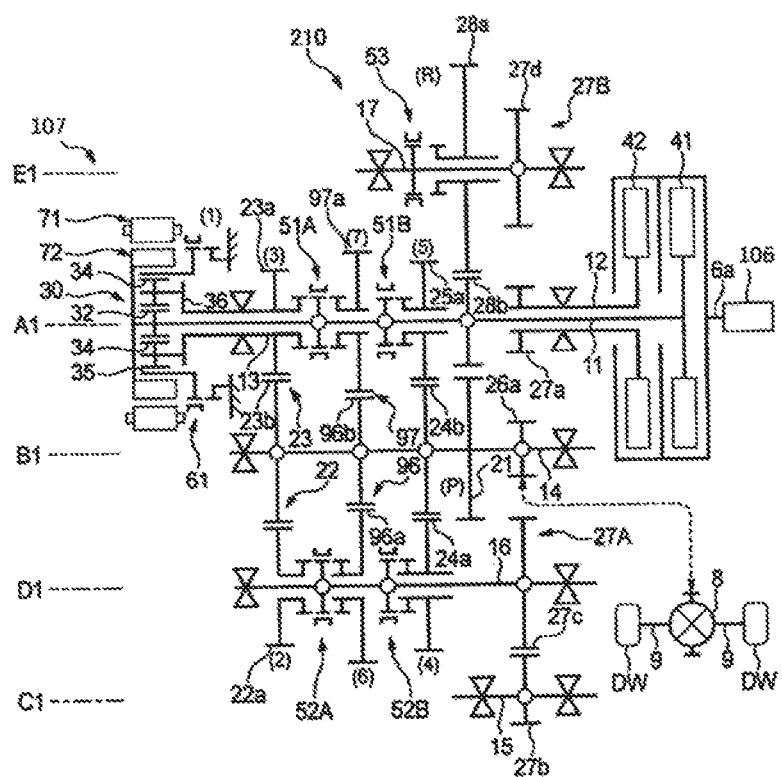

Further, the invention may use a hybrid vehicle using a driving system illustrated in FIGS. 8 and 9 using a twin-clutch type transmission, instead of the driving system in which the driving force is applied to the front driving axle 9f illustrated in FIG. 1. In FIG. 8, the constituent elements common to the configuration in FIG. 1 are denoted by the same reference numerals, and the description thereof will be simplified or omitted.

FIG. 8 is a block diagram illustrating an internal configuration of a hybrid electric vehicle according to another embodiment. The hybrid electric vehicle (hereinafter, simply referred to as a "vehicle") illustrated in FIG. 7 includes an internal combustion engine (ENG) 106, an electric motor (MOTf) 107, a transmission (T/M) 210, a battery (BAT) 101, a VCU (Voltage Control Unit) 102, an inverter (INVf) 103, a speed sensor 104, an electric motor (MOTr) 157, a VCU (Voltage Control Unit) 152, an inverter (INVr) 153, and an ECU (Electronic Control Unit) 105. The vehicle travels with power of the internal combustion engine 106 and/or the electric motors 107 and 157 according to traveling conditions, for example. In FIG. 8, a thick solid line indicates mechanical coupling, a double dotted line indicates power wiring, and a thin solid line arrow indicates a control signal or a detection signal. FIG. 8 is a diagram illustrating an internal configuration of a transmission 210 according to another embodiment and a relation between the transmission 210 and an internal combustion engine 106, an electric motor 107, and the like.

The internal combustion engine 106 outputs a driving force that travels a vehicle. The power output from the internal combustion engine 106 is transmitted to front driving wheels DWf via the transmission 210, a differential gear 8f, and a driving axle 9f. On a crankshaft 6a of the internal combustion engine 106, a first clutch 41 and a second clutch 42 of the transmission 210 are provided.

The electric motor 107 outputs the power for the vehicle to travel and/or the power for starting the internal combustion engine 106. The power for the vehicle traveling output from the electric motor 107 is transmitted to the front driving wheel DWf via the transmission 210, the differential gear 8f, and the driving axle 9f. In addition, the electric motor 107 can operate (regenerative operation) as a generator at the time of braking of the vehicle.

The electric motor 107 is a three-phase brushless DC motor, includes a stator 71 and a rotor 72 facing the stator 71, and is disposed on the outer peripheral side of a ring gear 35 of a planetary gear mechanism 30. The rotor 72 is connected to a sun gear 32 of the planetary gear mechanism 30, and is configured to rotate integrally with the sun gear 32 of the planetary gear mechanism 30.

The planetary gear mechanism 30 has the sun gear 32, the ring gear 35 which is disposed concentrically with the sun gear 32 and which is disposed so as to surround the periphery of the sun gear 32, planetary gears 34 which are made to mesh with the sun gear 32 and the ring gear 35, and a carrier 36 which supports the planetary gears 34, allowing them to revolve on their own axes and roll "walk" around the sun gear 32. In this way, the sun gear 32, the ring gear 35 and the carrier 36 are made to rotate differentially relative to each other.

A lock mechanism 61, which has a synchromesh mechanism and which is adapted to stop (lock) the rotation of the ring gear 35, is provided on the ring gear 35. A brake mechanism or the like may be used as the lock mechanism 61.

The transmission 210 shifts the power output from at least one of the internal combustion engine 106 and the electric motor 107 at a predetermined gear ratio and transmits the shifted driving force to the driving wheels DWf. The gear ratio of the transmission 210 is changed according to an instruction from the ECU 105. An internal configuration of the transmission 210 will be described below.

The control of the transmission 210 by the ECU 105 includes a control first and second odd-numbered gear change shifters 51A and 51B (to be described below) constituting the transmission 210, a control of first and second even-numbered gear change shifters 52A and 52B, a control of a reverse shifter 53, a control of a lock mechanism 61, a connecting/disconnecting control of a first clutch 41, and a connecting/disconnecting control of a second clutch 42.

Details of the internal configuration of the transmission 210 will be described below.

The transmission 210 is a so-called double-clutch type transmission which includes the first clutch 41, the second clutch 42 and the planetary gear mechanism 30, which have already been described, as well as plural change-speed gear trains, which will be described later.

More specifically, the transmission 210 includes a first main shaft 11 which is disposed coaxially with a crankshaft 6a of the internal combustion engine 106 (a rotational axis A1), a second main shaft 12, a connecting shaft 13, a counter shaft 14 which can rotate about a rotational axis BI which is disposed parallel to the rotational axis A1, a first intermediate shaft 15 which can rotate about a rotational axis C1 which is disposed parallel to the rotational axis A1, a second intermediate shaft 16 which can rotate about a rotational axis D1 which is disposed parallel to the rotational axis A1, and a reverse shaft 17 which can rotate about a rotational axis E1 which is disposed parallel to the rotational axis A1.

The first clutch 41 is provided at an end of the first main shaft 11 which faces the internal combustion engine 106, while the sun gear 32 of the planetary gear mechanism 30 and the rotor 72 of the electric motor 107 are mounted at an opposite end of the first main shaft 11 to the end which faces the internal combustion engine 106. Consequently, the first main shaft 11 is selectively connected to the crankshaft 6a of the internal combustion engine 106 by the first clutch 41 and is connected directly to the electric motor 107 so that power of the internal combustion engine 106 and/or the electric motor 107 is transmitted.

The second main shaft 12 is formed shorter than the first main shaft 11 and hollow and is disposed rotatably relative to the first main shaft 11 so as to cover the periphery of a portion of the first main shaft 11 which lies closer to the internal combustion engine 106. In addition, the second clutch 42 is provided at an end of the second main shaft 12 which faces the internal combustion engine 106 and an idle drive gear 27a is mounted integrally on the second main shaft 12 at an opposite end to the end which faces the internal combustion engine 106. Consequently, the second main shaft 12 is selectively connected to the crankshaft 6a of the internal combustion engine 106 by the second clutch 42 so that power of the internal combustion engine 106 is transmitted to the idle drive gear 27a.

The connecting shaft 13 is formed shorter than the first main shaft 11 and hollow and is disposed rotatably relative to the first main shaft 11 so as to cover the periphery of a portion of the first main shaft 11 which lies opposite to the internal combustion engine 106. In addition, a third speed drive gear 23a is rotated integrally on the connecting shaft 13 at an end which faces the internal combustion engine 106, and the carrier 36 of the planetary gear mechanism 30 is rotated integrally on the connecting shaft 13 at an end which lies opposite to the end which faces the internal combustion engine 106. Therefore, the carrier 36 provided on the connecting shaft 13 and the third speed drive gear 23a rotate integrally as the planetary gears 34 revolves.

Further, on the first main shaft 11, between a third speed drive gear 23a provide on the connecting shaft 13 and an idle drive gear 27a provided on the second main shaft 12, a seventh speed drive gear 97a and a fifth speed drive gear 25a constituting an odd-numbered gear change portion together with the third speed drive gear 23a are provided in this order from the third speed drive gear 23a so as to be rotatable relative to the first main shaft 11. In addition, between the fifth speed drive gear 25a and the idle drive gear 27a, a reverse driven gear 28b rotating integrally with the first main shaft 11 is provided.

Between the third speed drive gear 23a and the seventh speed drive gear 97a, a first odd-numbered gear change shifter 51A is provided to connect or disconnect between the first main shaft 11 and the third speed drive gear 23a or the seventh speed drive gear 97a. Between the seventh speed drive gear 97a and the fifth speed drive gear 25a, a second odd-numbered gear change shifter 51B is provided to connect or disconnect between the first main shaft 11 and the fifth speed drive gear 25a.

When the first odd-numbered gear change shifter 51A is in an in-gear state at a third speed connection position, the first main shaft 11 and the third speed drive gear 23a are coupled and rotated together. When the first odd-numbered gear change shifter 51A is in an in-gear state at a seventh speed connection position, the first main shaft 11 and the seventh speed drive gear 97a are coupled and rotated together. Further, the first odd-numbered gear change shifter 51A is in a neutral position, the first main shaft 11 rotates relative to the third speed drive gear 23a and the seventh speed drive gear 97a. When the first main shaft 11 and the third speed drive gear 23a rotate together, the sun gear 32 provided on the first main shaft 11 and a carrier 36 connected to the third speed drive gear 23a by the connecting shaft 13 integrally rotate, while a ring gear 35 also rotates together, and the planetary gear mechanism 30 is integrated.

When the second odd-numbered gear change shifter 51B is in an in-gear state, the first main shaft 11 and the fifth speed drive gear 25a are coupled and rotated together. When the second odd-numbered gear change shifter 51B is in a neutral position, the first main shaft 16 rotates relative to the fifth speed drive gear 25a.

A first idle driven gear 27b, which is adapted to mesh with the idle drive gear 27a which is provided on the second main shaft 12, is provided integrally on the first intermediate shaft 15.

A second idle driven gear 27c meshing with the first idle driven gear 27b provided on the first intermediate shaft 15 is provided on the second intermediate shaft 16 so as to rotate integrally with the second intermediate shaft 16. The second idle driven gear 27c constitutes a first idle gear set 27A together with the idle drive gear 27a and the first idle driven gear 27b described above, and the power of the internal combustion engine 106 is transmitted to the second intermediate shaft 16 from the second main shaft 12 via the first idle gear set 27A.

Further, on the second intermediate shaft 16, a second speed drive gear 22a, a sixth speed drive gear 96a, and a fourth speed drive gear 24a which constitute an even-numbered gear change portion are provided at positions corresponding to the third speed drive gear 23a, the seventh speed drive gear 97a, and the fifth speed drive gear 25a respectively provided on the first main shaft 11 so as to be rotatable relative to the second intermediate shaft 16.

A first even-numbered gear change shifter 52A is provided between the second speed drive gear 22a and the sixth speed drive gear 96a to connect or disconnect between the second intermediate shaft 16 and the second speed drive gear 22a or the sixth speed drive gear 96a. Between the sixth speed drive gear 96a and the fourth speed drive gear 24a, a second even-numbered gear change shifter 52B is provided to connect or disconnect between the second intermediate shaft 16 and the fourth speed drive gear 24a.

When the first even-numbered gear change shifter 52A is in an in-gear state at a second speed connection position, the second intermediate shaft 16 and the second speed drive gear 22a are coupled and rotated together. When the first even-numbered gear change shifter 52A is in an in-gear state at a sixth speed connection position, the second intermediate shaft 16 and the sixth speed drive gear 96a are coupled and rotated together. Further, the first even-numbered gear change shifter 52A is in a neutral position, the second intermediate shaft 16 rotates relative to the second speed drive gear 22a and the sixth speed drive gear 96a.

When the second even-numbered gear change shifter 52B is in an in-gear state, the second intermediate shaft 16 and the fourth speed drive gear 24a are coupled and rotated together. When the second even-numbered gear change shifter 52B is in a neutral position, the second intermediate shaft 16 rotates relative to the fourth speed drive gear 24a.

A first common driven gear 23b, a second common driven gear 96b, a third common driven gear 24b, a parking gear 21, and a final gear 26a are provided on the counter shaft 14 so as to be integrally rotatable in that order from a side opposite to the internal combustion engine 106.

Here, the first common driven gear 23b meshes with the third speed drive gear 23a provided on the connecting shaft 13 to constitute a third speed gear 23 together with the third speed drive gear 23a, and meshes with the second speed drive gear 22a provided on the second intermediate shaft 16 to constitute a second speed gear 22 together with the second speed drive gear 22a.

The second common driven gear 96b meshes with the seventh speed drive gear 97a provided on the first main shaft 11 to constitute a seventh speed gear 97 together with the seventh speed drive gear 97a, and meshes with the sixth speed drive gear 96a provided on the second intermediate shaft 16 to constitute a sixth speed gear 96 together with the sixth speed drive gear 96a.

The third common driven gear 24b meshes with the fifth speed drive gear 25a provided on the first main shaft 11 to constitute a fifth speed gear 25 together with the fifth speed drive gear 25a, and meshes with the fourth speed drive gear 24a provided on the second intermediate shaft 16 to constitute a fourth speed gear 24 together with the fourth speed drive gear 24a.

The final gear 26a meshes with the differential gear 8f, and the differential gear 8f is coupled to the driving wheels DWf and DWf via the driving axles 9f and 9f. Therefore, the power transmitted to the counter shaft 14 is output from the final gear 26a to the differential gear 8f, the driving axles 9f and 9f, and the driving wheels DWf and DWf.

A third idle driven gear 27d meshing with the first idle driven gear 27b provided on the first intermediate shaft 15 is provided integrally on the reverse shaft 17 so as to be rotatable. The third idle driven gear 27d constitutes a second idle gear set 27B together with the idle drive gear 27a and the first idle driven gear 27b which are described above, and the power of the internal combustion engine 106 is transmitted from the second main shaft 12 to the reverse shaft 17 via the second idle gear set 27B. In addition, a reverse drive gear 28a meshing with the reverse driven gear 28b provided on the first main shaft 11 is provided on the reverse shaft 17 so as to be rotatable relative to the reverse shaft 17. The reverse drive gear 28a constitutes a reverse gear set 28 together with the reverse driven gear 28b. Further, a reverse shifter 53 adapted to connect the reverse shaft 17 with the reverse drive gear 28a or release the connection of the shaft with the drive gear, is provided on an opposite side of the reverse drive gear 28a to a side opposite to the internal combustion engine 106.

When the reverse shifter 53 is in an in-gear state at a reverse connection position, the reverse shaft 17 and the reverse drive gear 28a rotate together. When the reverse shifter 53 is in a neutral position, the reverse shaft 17 rotates relative to the reverse drive gear 28a.

The first and second odd-numbered gear change shifters 51A and 51B, the first and second even-numbered gear change shifters 52A and 52B, and the reverse shifter 53 utilize a clutch mechanism having a synchromesh mechanism which makes rotational speeds of the shaft and the gear which are connected together coincide with each other.

In the transmission 210 which is configured as has been described heretofore, an odd-numbered gear change portion which is made up of the third speed drive gear 23a, the seventh speed drive gear 97a, and the fifth speed drive gear 25a is provided on the first main shaft 11 which is one transmission shaft of the two transmission shafts, while an even-numbered gear change portion which is made up of the second speed drive gear 22a, the sixth speed drive gear 96a, and the fourth speed drive gear 24a is provided on the second intermediate shaft 16 which is the other transmission shaft of the two transmission shafts.

In the twin-clutch type transmission 210 illustrated in FIG. 9, the odd-numbered gear change portions are provided on the shaft side to which the power of the internal combustion engine 106 and/or the electric motor 107 can be input by the locking of the first clutch 41, and the even-numbered gear change portions are provided on the shaft sides to which the power of the internal combustion engine 106 by the locking of the second clutch 42. However, the twin-clutch type transmission 210 may have a structure in which a relation between an odd-numbered stage and the even-numbered stage are reversed.

What is claimed is:

1. A control device for a transport vehicle configured to travel with a driving force output from an electric motor, wherein
when the transport vehicle is driven by a driving force of the electric motor and a variation rate is equal to or less than a predetermined value while a parameter relating to a traveling speed of the transport vehicle is less than a first predetermined value, the control device sets a threshold value, at which an output limit of the electric motor is started based on a parameter relating to a temperature of the electric motor or a temperature of an electric device for driving the electric motor, to a variable value corresponding to a required driving force to the transport vehicle.

2. The control device according to claim 1, wherein
the threshold value to be set when the required driving force is less than a second predetermined value is lower than the threshold value to be set when the required driving force is equal to or larger than the second predetermined value.

3. The control device according to claim 1, wherein:
the electric motor is a polyphase electric motor; and
the first predetermined value is an upper limit value at which a load is capable of concentrating on one phase in the electric motor or the electric device.

4. The control device according to claim 2, wherein
when the required driving force is equal to or larger than a third predetermined value smaller than the second predetermined value and is less than the second predetermined value, the output limit is performed by limiting a torque of the electric motor.

5. The control device according to claim 2, wherein
the threshold value to be set when the required driving force is equal to or larger than the second predetermined value is equal to a maximum value of the threshold value capable of being set in the transport vehicle.

6. The control device according to claim 4, wherein:
the transport vehicle includes a driving source configured to drive the transport vehicle;
the electric motor drives one driving axle of the transport vehicle;

the driving source drives the other driving axle of the transport vehicle; and the driving force of the driving source is increased while the torque of the electric motor is limited.

7. A control method of a transport vehicle configured to travel with a driving force output from an electric motor, the control method comprising: setting a threshold value, at which an output limit of the electric motor is started based on a parameter relating to a temperature of the electric motor or a temperature of an electric device for driving the electric motor, to a variable value corresponding to a required driving force to the transport vehicle when the transport vehicle is driven by a driving force of the electric motor and a variation rate is equal to or less than a predetermined value while a parameter relating to a traveling speed of the transport vehicle is less than a first predetermined value.

8. The control method according to claim 7, wherein the threshold value to be set when the required driving force is less than a second predetermined value is lower than the threshold value to be set when the required driving force is equal to or larger than the second predetermined value.

9. The control method according to claim 7, wherein:

the electric motor is a polyphase electric motor; and the first predetermined value is an upper limit value at which a load is capable of concentrating on one phase in the electric motor or the electric device.

10. The control method according to claim 8, wherein when the required driving force is equal to or larger than a third predetermined value smaller than the second predetermined value and is less than the second predetermined value, the output limit is performed by limiting a torque of the electric motor.

11. The control method according to claim 8, wherein the threshold value to be set when the required driving force is equal to or larger than the second predetermined value is equal to a maximum value of the threshold value capable of being set in the transport vehicle.

12. The control method according to claim 10, wherein:

the transport vehicle includes a driving source configured to drive the transport vehicle;

the control method further comprising:

driving one driving axle of the transport vehicle by the electric motor;

driving the other driving axle of the transport vehicle by the driving source; and increasing the driving force of the driving source while the torque of the electric motor is limited.

* * * * *